(12) United States Patent
Longo et al.

(10) Patent No.: US 10,642,763 B2
(45) Date of Patent: May 5, 2020

(54) QUALITY OF SERVICE POLICY SETS

(71) Applicant: NETAPP, INC., Sunnyvale, CA (US)

(72) Inventors: Austin Longo, Boulder, CO (US); Jared Cantwell, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 258 days.

(21) Appl. No.: 15/270,973

(22) Filed: Sep. 20, 2016

(65) Prior Publication Data

US 2018/0081832 A1 Mar. 22, 2018

(51) Int. Cl.
 *G06F 3/06* (2006.01)
 *G06F 11/34* (2006.01)
 *G06F 13/16* (2006.01)
 *G06F 13/40* (2006.01)
 *H04L 29/08* (2006.01)

(52) U.S. Cl.
 CPC .......... *G06F 13/1689* (2013.01); *G06F 3/061* (2013.01); *G06F 3/067* (2013.01); *G06F 3/0659* (2013.01); *G06F 11/3433* (2013.01); *G06F 13/16* (2013.01); *G06F 13/4068* (2013.01); *H04L 67/00* (2013.01); *H04L 67/10* (2013.01); *G06F 11/3419* (2013.01); *G06F 2206/1012* (2013.01)

(58) Field of Classification Search
 CPC .... G06F 13/1689; G06F 3/061; G06F 3/0659; G06F 3/067; G06F 11/3433; G06F 13/16; G06F 13/4068; H04L 67/00; H04L 67/10
 USPC .......... 710/17–18, 29, 33, 107, 110
 See application file for complete search history.

(56) References Cited

U.S. PATENT DOCUMENTS

| | | | |
|---|---|---|---|
| 6,604,155 B1 | 8/2003 | Chong, Jr. | |
| 7,174,379 B2 | 2/2007 | Agarwal et al. | |
| 8,429,096 B1 * | 4/2013 | Soundararajan | G06F 9/5005 706/12 |
| 9,026,694 B1 * | 5/2015 | Davidson | G06F 9/505 710/38 |
| 9,798,497 B1 * | 10/2017 | Schick | G06F 3/0664 |
| 9,953,351 B1 * | 4/2018 | Sivasubramanian | G06Q 30/0283 |
| 2004/0107281 A1 | 6/2004 | Bose et al. | |
| 2004/0133622 A1 | 7/2004 | Clubb et al. | |
| 2011/0119412 A1 * | 5/2011 | Orfitelli | G06F 13/385 710/20 |
| 2011/0238857 A1 | 9/2011 | Certain et al. | |

(Continued)

*Primary Examiner* — Farley Abad
*Assistant Examiner* — Henry W Yu
(74) *Attorney, Agent, or Firm* — Cesari and McKenna, LLP

(57) ABSTRACT

Disclosed are systems, computer-readable mediums, and methods for managing input-output operations within a system including at least one client and a storage system. A processor receives information regarding allocated input-output operations (IOPS) associated with a client accessing a storage system storing client data. The information includes a number of allocated total IOPS, a number of allocated read IOPS, and a number of allocated write IOPS. The processor also receives a requested number of write IOPS associated with the at least one client's request to write to the storage system. The processor determines a target write IOPS based on the number of allocated total IOPS, the number of allocated write IOPS and the requested number of write IOPS, and executes the determined target write IOPS within the first time period.

20 Claims, 11 Drawing Sheets

(56) References Cited

U.S. PATENT DOCUMENTS

| | | | |
|---|---|---|---|
| 2012/0311292 A1* | 12/2012 | Maniwa | G06F 3/061 |
| | | | 711/170 |
| 2013/0024641 A1* | 1/2013 | Talagala | G06F 11/3485 |
| | | | 711/170 |
| 2013/0086270 A1* | 4/2013 | Nishikawa | G06F 9/5011 |
| | | | 709/226 |
| 2013/0159815 A1* | 6/2013 | Jung | G06F 11/10 |
| | | | 714/773 |
| 2013/0262412 A1* | 10/2013 | Hawton | G06F 16/1744 |
| | | | 707/693 |
| 2013/0325828 A1* | 12/2013 | Larson | G06F 16/2365 |
| | | | 707/703 |
| 2016/0283139 A1* | 9/2016 | Brooker | G06F 3/0619 |

\* cited by examiner

QUALITY OF SERVICE POLICY SETS

BACKGROUND

The following description is provided to assist the understanding of the reader. None of the information provided is admitted to be prior art.

In data storage architectures, a client's data may be stored in a volume. The client can access the client data from the volume via one or more volume servers coupled to the volume. The volume servers can map the locations of the data specified by the client, such as file name, drive name, etc., into unique identifiers that are specific to the location of the client's data on the volume. Using the volume server as an interface to the volume allows the freedom to distribute the data evenly over the one or more volumes. The even distribution of data can be beneficial in terms of volume and system performance.

Read and write requests of the client are typically transformed into read and/or write input-output operations (IOPS). For example, a file read request by a client can be transformed into one or more read IOPS of some size. Similarly, a file write request by the client can be transformed into one or more write IOPS.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION OF EXAMPLE EMBODIMENTS

Overview

Figure 1A:
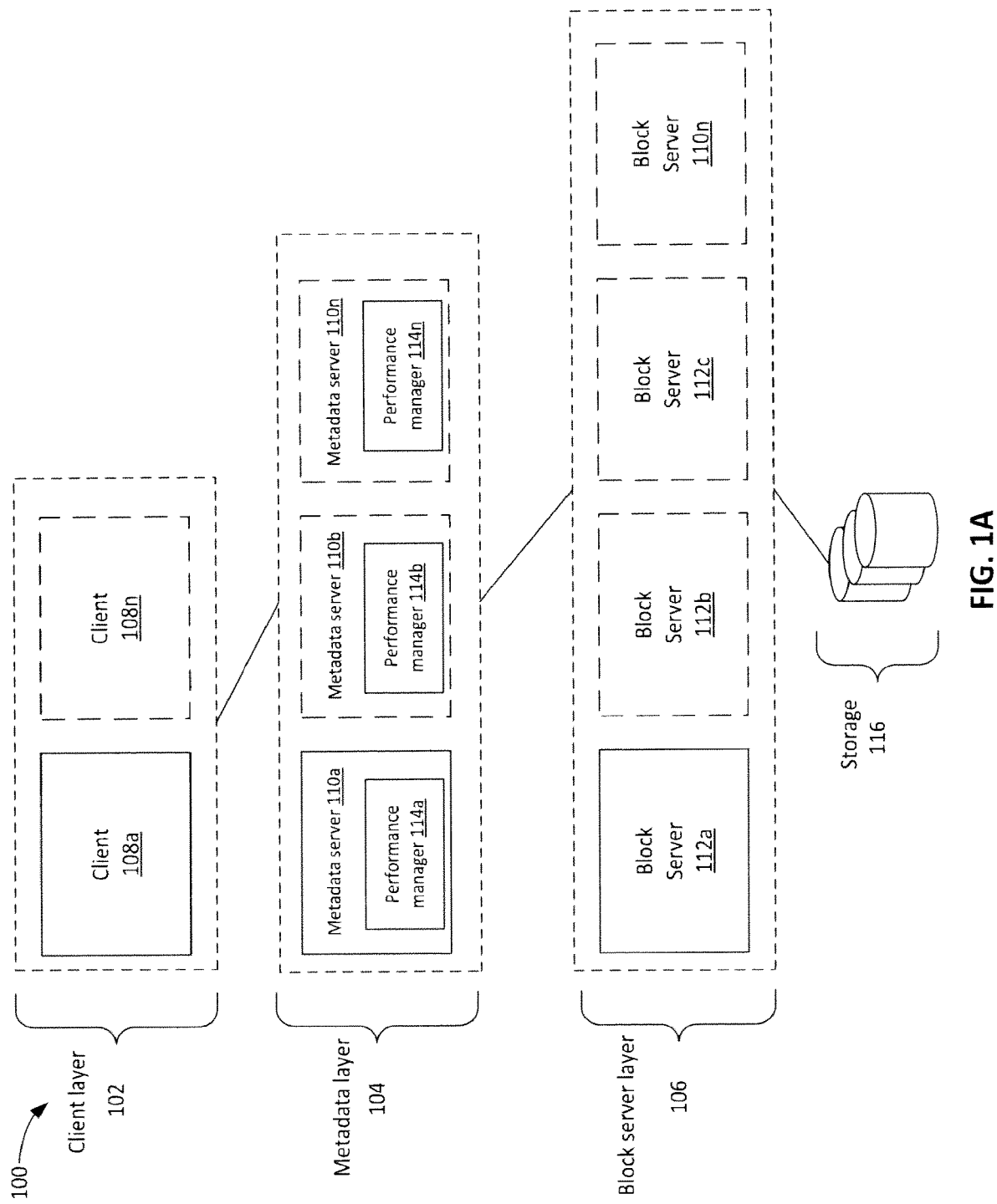
FIG. 1A depicts a simplified system for performance management in a storage system in accordance with an illustrative implementation.

In one embodiment, a method for managing input-output operations within a system including at least one client and storage system includes receiving, at a processor, a number of allocated total input-output operations (IOPS), a number of allocated read IOPS and a number of allocated write IOPS for at least one client accessing a storage system during a first time period. Each of the number of allocated read IOPS and the number of allocated write IOPS is not greater than the number of allocated total IOPS. The method further includes receiving, at the processor, a requested number of write IOPS associated with the at least one client's request to write to the storage system. The method also includes determining, at the processor, a target write IOPS based on the number of allocated total IOPS, the number of allocated write IOPS and the requested number of write IOPS. The method further includes executing, by the processor, the determined target write IOPS within the first time period.

In one or more embodiments, a system includes a storage system and a processor coupled to the storage system. The storage system is configured to store client data. The processor is configured to receive a number of allocated total input-output operations (IOPS), a number of allocated read IOPS and a number of allocated write IOPS for at least one client accessing a storage system during a first time period. Each of the number of allocated read IOPS and the number of allocated write IOPS is not greater than the number of allocated total IOPS. The processor is further configured to receiving a requested number of write IOPS associated with the at least one client's request to write to the storage system. The processor is additionally configured to determine a target write IOPS based on the number of allocated total IOPS, the number of allocated write IOPS, and the requested number of write IOPS. The processor is also configured to execute the determined target write IOPS within the first time period.

The foregoing summary is illustrative only and is not intended to be in any way limiting. In addition to the illustrative aspects, implementations, and features described above, further aspects, implementations, and features will become apparent by reference to the following drawings and the detailed description.

SPECIFIC EXAMPLE EMBODIMENTS

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

DETAILED DESCRIPTION

Described herein are techniques for a performance management storage system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

FIG. 1A depicts a simplified system for performance management in a storage system 100 in accordance with an illustrative implementation. System 100 includes a client layer 102, a metadata layer 104, a block server layer 106, and storage 116.

Before discussing how particular implementations manage performance of clients 108, the structure of a possible system is described. Client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Metadata layer 104 includes one or more metadata servers 110a-110n. Performance managers 114 may be located on metadata servers 110a-110n. Block server layer 106 includes one or more block servers 112a-112n. Block servers 112a-112n are coupled to storage 116, which stores volume data for clients 108. Each client 108 may be associated with a volume. In one implementation, only one client 108 accesses data in a volume; however, multiple clients 108 may access data in a single volume.

Storage 116 can include multiple solid state drives (SSDs). In one implementation, storage 116 can be a cluster of individual drives coupled together via a network. When the term "cluster" is used, it will be recognized that cluster may represent a storage system that includes multiple disks that may not be networked together. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 and slice servers 124 maintain a mapping between a block identifier and the location of the data block in a storage medium of block server 112. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Figure 1B:
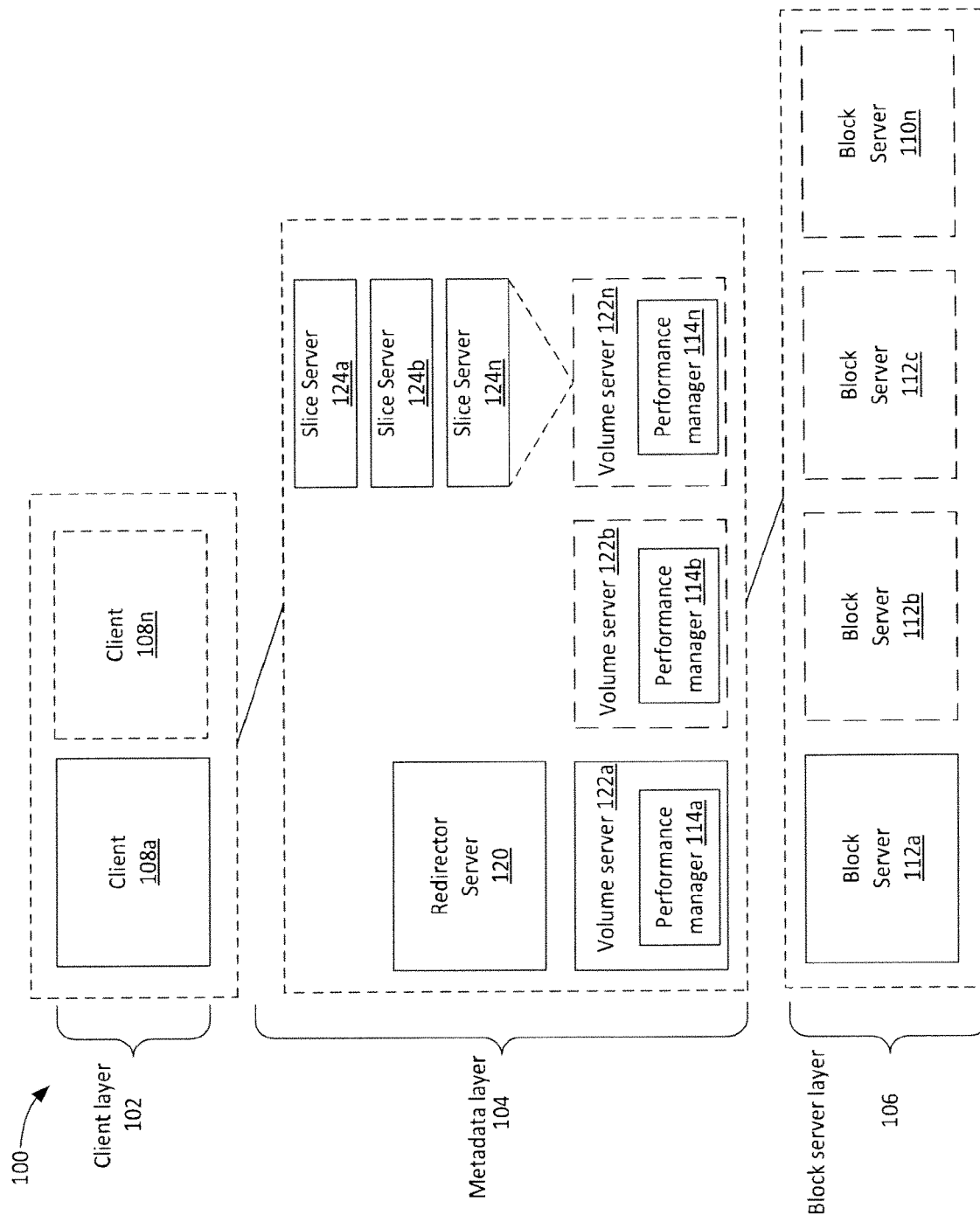
FIG. 1B depicts a more detailed example of a system in accordance with an illustrative implementation.

FIG. 1B depicts a more detailed example of system 100 according to one implementation. Metadata layer 104 may include a redirector server 120 and multiple volume servers 122. Each volume server 122 may be associated with a plurality of slice servers 124.

In this example, client 108a wants to connect to a volume (e.g., client address). Client 108a communicates with redirector server 120, identifies itself by an initiator name, and also indicates a volume by target name that client 108a wants to connect to. Different volume servers 122 may be responsible for different volumes. In this case, redirector server 120 is used to redirect the client to a specific volume server 122. To client 108, redirector server 120 may represent a single point of contact. The first request from client 108a then is redirected to a specific volume server 122. For example, redirector server 120 may use a database of volumes to determine which volume server 122 is a primary volume server for the requested target name. The request from client 108a is then directed to the specific volume server 122 causing client 108a to connect directly to the specific volume server 122. Communications between client 108a and the specific volume server 122 may then proceed without redirector server 120.

Volume server 122 performs functions as described with respect to metadata server 110. Additionally, each volume server 122 includes a performance manager 114. For each volume hosted by volume server 122, a list of block identifiers is stored with one block identifier for each logical block on the volume. Each volume may be replicated between one or more volume servers 122 and the metadata for each volume may be synchronized between each of the volume servers 122 hosting that volume. If volume server 122 fails, redirector server 120 may direct client 108 to an alternate volume server 122.

In one implementation, the metadata being stored on volume server 122 may be too large for one volume server 122. Thus, multiple slice servers 124 may be associated with each volume server 122. The metadata may be divided into slices and a slice of metadata may be stored on each slice server 124. When a request for a volume is received at volume server 122, volume server 122 determines which slice server 124 contains metadata for that volume. Volume server 122 then routes the request to the appropriate slice server 124. Accordingly, slice server 124 adds an additional layer of abstraction to volume server 122.

The above structure allows storing of data evenly across the cluster of disks. For example, by storing data based on block identifiers, data can be evenly stored across drives of a cluster. As described above, data evenly stored across the cluster allows for performance metrics to manage load in system 100. If the system 100 is under a load, clients can be throttled or locked out of a volume. When a client is locked out of a volume, metadata server 110 or volume server 122 may close the command window or reduce or zero the amount of read or write data that is being processed at a time for client 108. The metadata server 110 or the volume server 122 can queue access requests for client 108, such that IO requests from the client 108 can be processed after the client's access to the volume resumes after the lock out period.

Performance Metrics and Load of the Storage System

The storage system 100 can also include a performance manager 114 that can monitor clients' use of the storage system's resources. In addition, performance manager 114 can regulate the client's use of the storage system 100. The client's use of the storage system can be adjusted based upon performance metrics, the client's quality of service parameters, and the load of the storage system. Performance metrics are various measurable attributes of the storage system. One or more performance metrics can be used to calculate a load of the system, which, as described in greater detail below, can be used to throttle clients of the system.

Performance metrics can be grouped in different categories of metrics. System metrics is one such category. System metrics are metrics that reflect the use of the system or components of the system by all clients. System metrics can include metrics associated with the entire storage system or with components within the storage system. For example, system metrics can be calculated at the system level, cluster level, node level, service level, or drive level. Space utilization is one example of a system metric. The cluster space utilization reflects how much space is available for a particular cluster, while the drive space utilization metric reflects how much space is available for a particular drive. Space utilization metrics can also be determined for at the system level, service level, and the node level. Other examples of system metrics include measured or aggregated metrics such as read latency, write latency, input/output operations per second (IOPS), read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients 108 and the volume of data. Read latency can be the time taken for the system 100 to read data from a volume and return the data to a client. Write latency can be the time taken for the system to write data and return a success indicator to the client. Workload type can indicate if IO access is sequential or random. The data type can identify the type of data being accessed/written, e.g., text, video, images, audio, etc. The write cache capacity refers to a write cache or a node, a block server, or a volume server. The write cache is relatively fast memory that is used to store data before it is written to storage 116. As noted above, each of these metrics can be independently calculated for the system, a cluster, a node, etc. In addition, these values can also be calculated at a client level.

Client metrics are another category of metrics that can be calculated. Unlike system metrics, client metrics are calculated taking into account the client's use of the system. As described in greater detail below, a client metric may include use by other client's that are using common features of the system. Client metrics, however, will not include use of non-common features of the system by other clients. In one implementation, client metrics can include the same metrics as the system metrics, but rather than being component or system wide, are specific to a volume of the client. For example, metrics such as read latency or write IOPS can be monitored for a particular volume of a client.

Metrics, both system and client, can be calculated over a period of time, e.g., 250 ms, 500 ms, 1s, etc. Accordingly, different values such as a min, max, standard deviation, average, etc., can be calculated for each metric. One or more of the metrics can be used to calculate a value that represents a load of the storage system. Loads can be calculated for the storage system as a whole, for individual components, for individual services, and/or individual clients. Load values, e.g., system load values and/or client load values, can then be used by the quality of service system to determine if and how clients should be throttled.

As described in greater detail below, performance for individual clients can be adjusted based upon the monitored metrics. For example, based on a number of factors, such as system metrics, client metrics, and client quality of service parameters, a number of IOPS that can be performed by a client 108 over a period of time may be managed. In one implementation, performance manager 114 regulates the number of IOPS that are performed by locking client 108 out of a volume for different amounts of time to manage how many IOPS can be performed by client 108. For example, when client 108 is heavily restricted, client 108 may be locked out of accessing a volume for 450 milliseconds every 500 milliseconds and when client 108 is not heavily restricted, client 108 is blocked out of a volume every 50 milliseconds for every 500 milliseconds. The lockout effectively manages the number of IOPS that client 108 can perform every 500 milliseconds. Although examples using IOPS are described, other metrics may also be used, as will be described in more detail below.

The use of metrics to manage load in system 100 is possible because a client's effect on global cluster performance is predictable due to the evenness of distribution of data, and therefore, data load. For example, by locking out client 108 from accessing the cluster, the load in the cluster may be effectively managed. Because load is evenly distributed, reducing access to the client's volume reduces that client's load evenly across the cluster. However, conventional storage architectures where hot spots may occur result in unpredictable cluster performance. Thus, reducing access by a client may not alleviate the hot spots because the client may not be accessing the problem areas of the cluster. Because in the described embodiment, client loads are evenly distributed through the system, a global performance pool can be calculated and individual client contributions to how the system is being used can also be calculated.

Client Quality of Service Parameters

In addition to system metrics and client metrics, client quality of service (QoS) parameters can be used to affect how a client uses the storage system. Unlike metrics, client QoS parameters are not measured values, but rather variables than can be set that define the desired QoS bounds for a client. Client QoS parameters can be set by an administrator or a client. In one implementation, client QoS parameters include minimum, maximum, and max burst values. Using IOPS as an example, a minimum IOPS value is a proportional amount of performance of a cluster for a client. Thus, the minimum IOPS is not a guarantee that the volume will always perform at this minimum IOPS value. When a volume is in an overload situation, the minimum IOPS value is the minimum number of IOPS that the system attempts to provide the client. However, based upon cluster performance, an individual client's IOPS may be lower or higher than the minimum value during an overload situation. In one implementation, the system 100 can be provisioned such that the sum of the minimum IOPS across all clients is such that the system 100 can sustain the minimum IOPS value for all clients at a given time. In this situation, each client should be able to perform at or above its minimum IOPS value. The system 100, however, can also be provisioned such that the sum of the minimum IOPS across all clients is such that the system 100 cannot sustain the minimum IOPS for all clients. In this case, if the system becomes overloaded through the use of all clients, the client's realized IOPS can be less than the client's minimum IOPS value. In failure situations, the system may also throttle users such that their realized IOPS are less than their minimum IOPS value. A maximum IOPS parameter is the maximum sustained IOPS value over an extended period of time. The max burst IOPS parameter is the maximum IOPS value that a client can "burst" above the maximum IOPS parameter for a short period of time based upon credits. In one implementation, credits for a client are accrued when the client is operating under their respective maximum IOPS parameter. Accordingly, a client will only be able to use the system in accordance with their respective maximum IOPS and maximum burst IOPS parameters. For example, a single client will not be able to use the system's full resources, even if they are available, but rather, is bounded by their respective maximum IOPS and maximum burst IOPS parameters.

Figure 2:
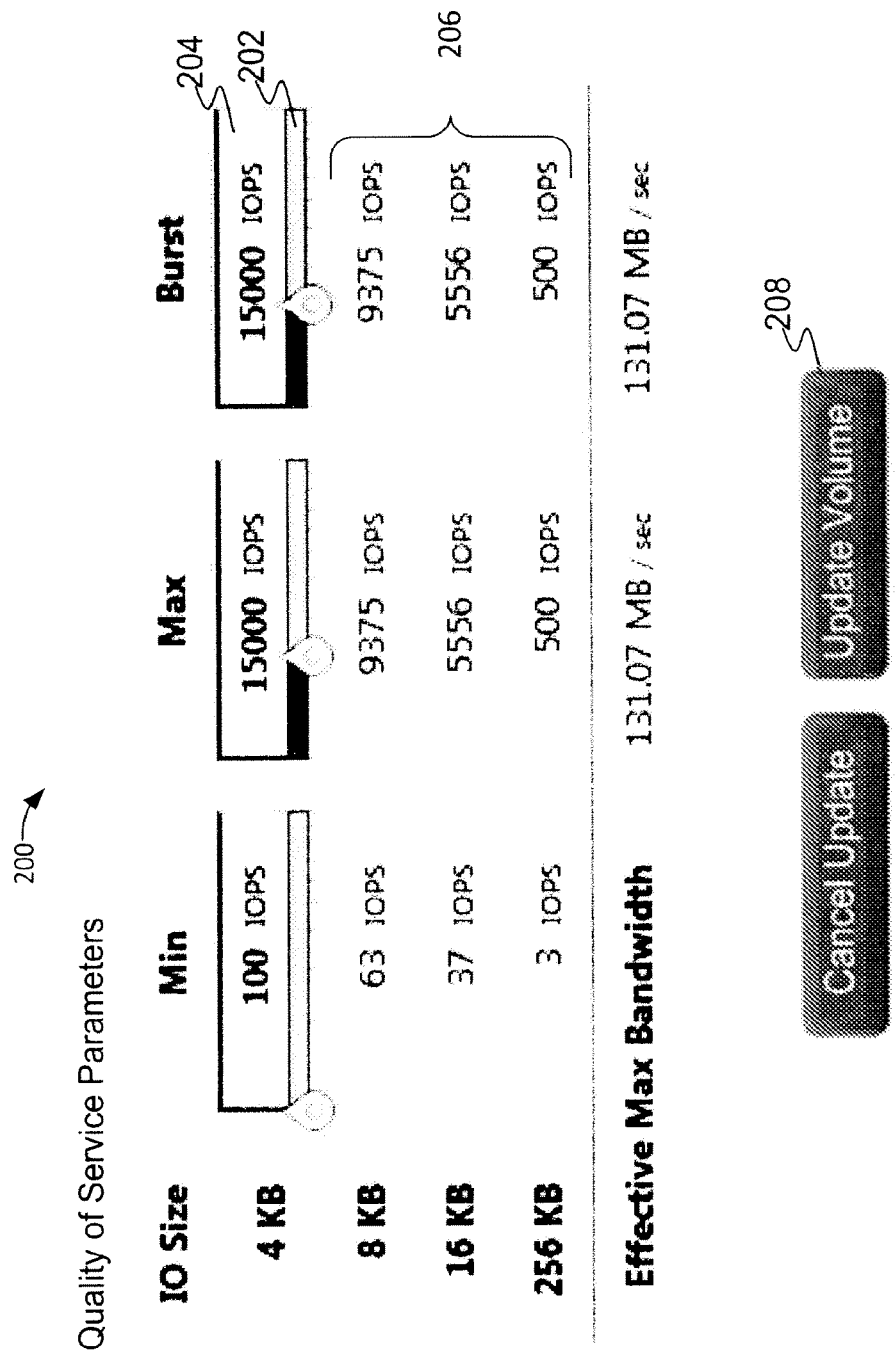
FIG. 2 depicts a user interface for setting quality of service parameters in accordance with an illustrative implementation.

As noted above, client QoS parameters can be changed at any time by the client or an administrator. FIG. 2 depicts a user interface 200 for setting client QoS in accordance with one illustrative implementation. The user interface 200 can include inputs that are used to change various QoS parameters. For example, slide bars 202 and/or text boxes 204 can be used to adjust QoS parameters. As noted above in one implementation, client QoS parameters include a minimum IOPS, a maximum IOPS, and a maximum burst IOPS. Each of these parameters can be adjusted with inputs, e.g., slide bars and/or text boxes. In addition, the IOPS for different size IO operations can be shown. In the user interface 200, the QoS parameters associated with 4 k sized IO operations are changed. When any performance parameter is changed, the corresponding IOPS for different sized IO operations are automatically adjusted. For example, when the burst parameter is changed, IOPS values 206 are automatically adjusted. Once the QoS parameters have been set, activating a save changes button 208 updates the client's QoS parameters. As described below, the target performance manager 402 can use the updated QoS parameters, such that the updated QoS parameters take effect immediately. The updated QoS parameters take effect without requiring any user data to be moved in the system.

Performance Management

Figure 3:
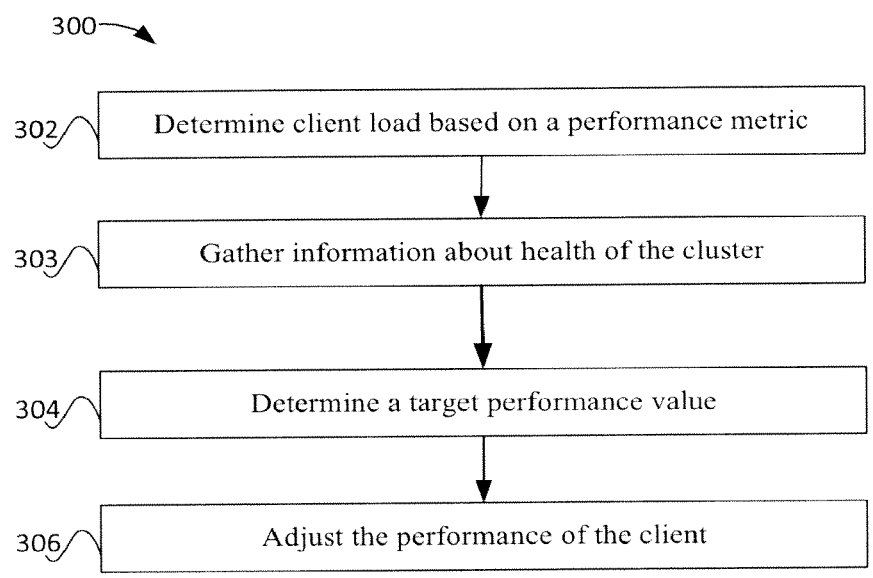
FIG. 3 depicts a simplified flowchart of a method of performing performance management in accordance with an illustrative implementation.

FIG. 3 depicts a simplified flowchart 300 of a method of performing performance management according to one implementation. Additional, fewer, or different operations of the method 300 may be performed, depending on the particular embodiment. The method 300 can be implemented on a computing device. In one implementation, the method 300 is encoded on a computer-readable medium that contains instructions that, when executed by a computing device, cause the computing device to perform operations of the method 300.

At 302, performance manager 114 determines a client load based on one or more performance metrics. For example, performance manager 114 may calculate a client's load based on different performance metrics, such as IOPS, bandwidth, and latency. The metrics may be historical metrics and/or current performance metrics. Historical performance may measure previous performance for an amount of time, such as the last week of performance metrics. Current performance may be real-time performance metrics. Using these performance metrics, e.g., system metrics and/or client metrics, a load value is calculated.

At 303, performance manager 114 gathers information about health of the cluster. The health of the cluster may be information that can quantify performance of the cluster, such as a load value. The cluster health information may be gathered from different parts of system 100, and may include health in many different aspects of system 100, such as system metrics and/or client metrics. In addition, cluster health information can be calculated as a load value from the client and/or system metrics. The health information may not be cluster-wide, but may include information that is local to the volume server 122 that is performing the performance management. The cluster health may be affected; for example, if there is a cluster data rebuild occurring, total performance of the cluster may drop. Also, when data discarding, adding or removing of nodes, adding or removing of volumes, power failures, used space, or other events affecting performance are occurring, performance manager 114 gathers this information from the cluster.

At 304, performance manager 114 determines a target performance value. For example, based on the load values and client quality of service parameters, a target performance value is determined. The target performance value may be based on different criteria, such as load values, client metrics, system metrics, and quality of service parameters. The target performance value is the value at which performance manager 114 would like client 108 to operate. For example, the target performance may be 110 IOPS.

At 306, performance manager 114 adjusts the performance of client 108. For example, the future client performance may be adjusted toward the target performance value. If IOPS are being measured as the performance metric, the number of IOPS a client 108 performs over a period of time may be adjusted to the target performance value. For example, latency can be introduced or removed to allow the number of IOPS that a client can perform to fluctuate. In one example, if the number of IOPS in the previous client performance is 80 and the target performance value is 110 IOPS, then the performance of the client is adjusted to allow client 108 to perform more IOPS such that the client's performance moves toward performing 110 IOPS.

Traditional provisioning systems attempt to achieve a quality of service by placing a client's data on a system that should provide the client with the requested quality of service. A client requesting a change to their quality of service, therefore, can require that the client's data be moved from one system to another system. For example, a client that wants to greatly increase its quality of service may need to be moved to a more robust system to ensure the increased quality of service. Unlike the traditional provisioning systems, the performance manager can dynamically adjust quality of service for specific clients without moving the client's data to another cluster. Accordingly, quality of service for a client can be adjusted instantly, and a client can change QoS parameters without requiring manual intervention for those QoS parameters to take effect. This feature allows the client to schedule changes to their QoS parameters. For example, if a client performs backups on the first Sunday of every month from 2:00 am-4:00 am, they could have their QoS parameters automatically change just prior to the start of the backup and change back after the backup finishes. This aspect allows a client the flexibility to schedule changes to their QoS parameters based upon the client's need. As another example, the client can be presented with a turbo button. When selected, the turbo button increases the client's QoS parameters by some factor, e.g., 3, 4, 5, etc., or to some large amount. Clients could use this feature if their data needs were suddenly increased, such as when a client's website is experiencing a high number of visitors. The client could then unselect the turbo button to return to their original QoS parameters. Clients could be charged for how long they use the turbo button features. In another implementation, the turbo button remains in effect for a predetermined time before the client's original QoS parameters are reset.

In addition to the above examples, clients and/or administrators can set client QoS parameters based upon various conditions. In addition, as noted above client QoS parameters are not limited to IOPS. In different implementations, client QoS parameters can be bandwidth, latency, etc. According to different embodiments, the storage system may be configured or designed to allow service providers, clients, administrators and/or users, to selectively and dynamically configure and/or define different types of QoS and provisioning rules which, for example, may be based on various different combinations of QoS parameters and/or provisioning/QoS target types, as desired by a given user or client.

According to different embodiments, examples of client QoS parameters may include, but are not limited to, one or more of the following (or combinations there:

IOPS;
Bandwidth;
Write Latency;
Read Latency;
Write buffer queue depth;
I/O Size (e.g., amount of bytes accessed per second);
I/O Type (e.g., Read I/Os, Write I/Os, etc.);
Data Properties such as, for example, Workload Type (e.g., Sequential, Random); Dedupe-ability; Compressability; Data Content; Data Type (e.g., text, video, images, audio, etc.);
etc.

According to different embodiments, examples of various provisioning/QoS target types may include, but are not limited to, one or more of the following (or combinations thereof):

Service or group of Services;
Client or group of Clients;
Connection (e.g. Client connection);
Volume, or group of volumes;
Node or group of nodes;
Account/Client;
User;
iSCSI Session;
Time segment;
Read IOPS amount;
Write IOPS amount;
Application Type;
Application Priority;
Region of Volume (e.g., Subset of LBAs);
Volume Session(s);
I/O size;
Data Property type;
etc.

Figure 8:
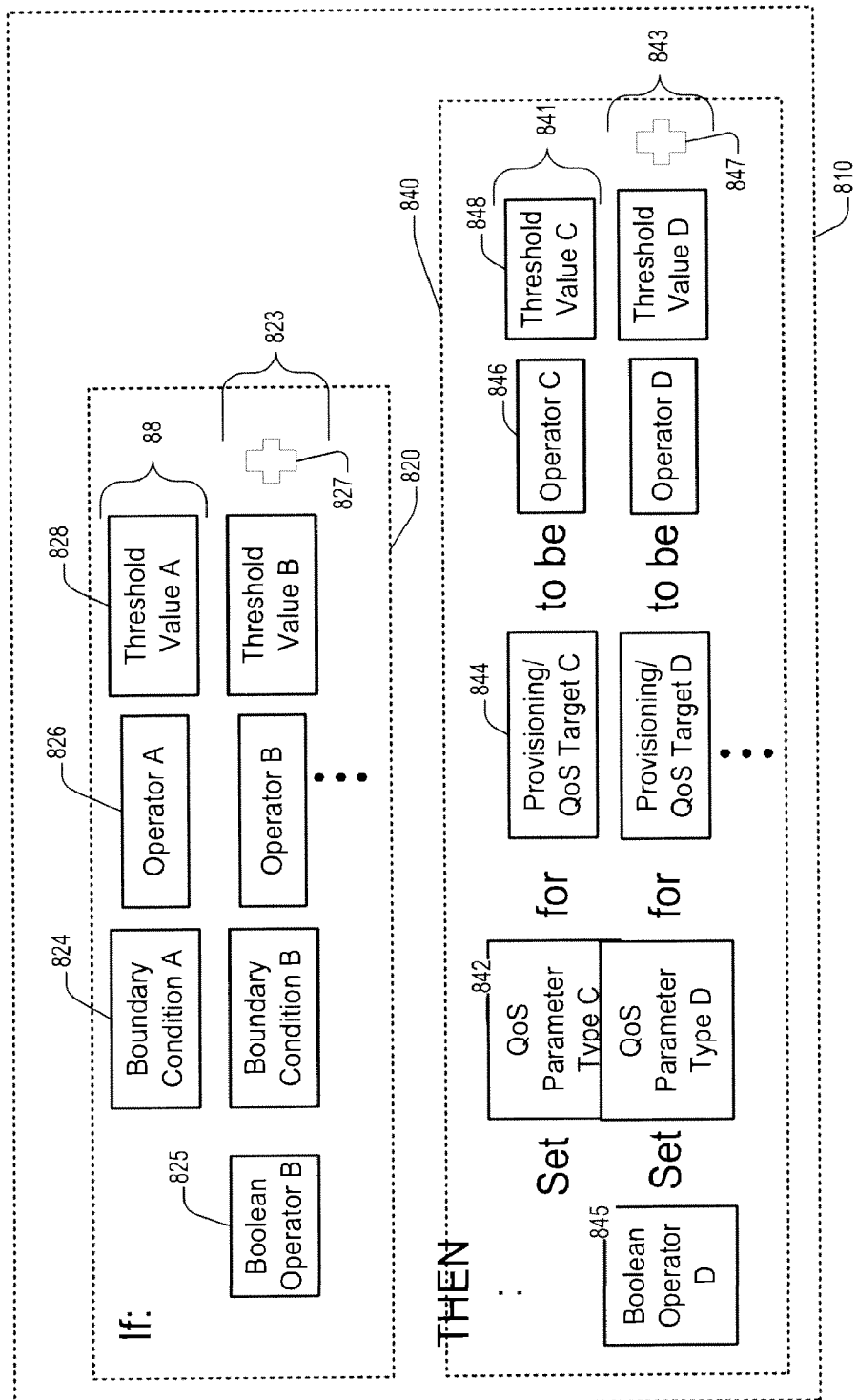
FIG. 8 shows an example QoS Interface GUI 800 which may be configured or designed to enable service providers, users, and/or other entities to dynamically define and/or create different performance classes of use and/or to define performance/QoS related customizations in the storage system in accordance with an illustrative implementation.

FIG. 8 shows an example QoS Interface GUI 800 which may be configured or designed to enable service providers, users, and/or other entities to dynamically define and/or create different performance classes of use and/or to define performance/QoS related customizations in the storage system. In at least one embodiment, the QoS Interface GUI may be configured or designed to allow service providers, users, and/or other entities dynamically switch between the different performance classes of use, allowing such clients to dynamically change their performance settings on the fly (e.g., in real-time).

For example, according to various embodiments, a service provider may dynamically define and/or create different performance classes of use in the storage system, may allow clients to dynamically switch between the different performance classes of use, allowing such clients to dynamically modify or change their performance settings on the fly (e.g., in real-time). In at least one embodiment, the storage system is configured or designed to immediately implement the specified changes for the specified provisioning/QoS Targets, and without requiring the client's storage volume to be taken off-line to implement the performance/QoS modifications. In at least one embodiment, the different performance classes of use may each have associated therewith a respective set of QoS and/or provisioning rules (e.g., 810) which, for example, may be based on various different combinations of QoS parameters and/or provisioning/QoS target types.

The above process for performing performance management may be performed continuously over periods of time. For example, a period of 500 milliseconds is used to evaluate whether performance should be adjusted. As will be described in more detail below, client 108 may be locked out of performing IOPS for a certain amount of time each period to reduce or increase the number of IOPS being performed.

Examples of different types of conditions, criteria and/or other information which may be used to configure the QoS Interface GUI of FIG. 8 may include, but are not limited to, one or more of the following (or combinations thereof):

Example Boundary Conditions (e.g., 824)

| | |
|---|---|
| LOAD(Service); | Date |
| LOAD(Read); | Read IOPS |
| LOAD(Write); | Write IOPS |
| LOAD(Write_Buffer); | Application Type |
| LOAD(Client-Read); | Application Priority |
| LOAD(Client-Write); | Region of Volume |
| LOAD(Client); | LBA ID |
| LOAD(Cluster); | Volume Session ID |
| LOAD(System) | Connection ID |
| Write Latency; | I/O size |
| Read Latency; | I/O Type |
| Write buffer queue depth; | Workload Type |
| LOAD(Client); | Dedupe-ability |
| Volume ID | Compressability |
| Group ID | Data Content |
| Account ID | Data Type |
| Client ID | Data Properties |
| User ID | Detectable Condition and/or Event |
| iSCSI Session ID | Etc. |
| Time | |

Example QoS Parameters (e.g., 842)

| | |
|---|---|
| MAX IOPS | I/O Type |
| MIN IOPS | MAX Read I/O |
| BURST IOPS | MIN Read I/O |
| MAX Bandwidth | BURST Read I/O |
| MIN Bandwidth | MAX Write I/O |
| BURST Bandwidth | MIN Write I/O |
| MAX Latency | BURST Write I/O |
| MIN Latency | I/O Type |

-continued

| | |
|---|---|
| BURST Latency | Workload Type |
| MAX I/O Size | Dedupe-ability |
| MIN I/O Size | Compressability |
| BURST I/O Size | Data Content |
| Data Type | Billing Amount |

Example Provisioning/QoS Targets (e.g., 844)

| | |
|---|---|
| Cluster ID | Application Type |
| Service ID | Application Priority |
| Client ID | Region of Volume |
| Connection ID | LBA ID |
| Node ID | Volume Session ID |
| Volume ID | Connection ID |
| Group ID | I/O size |
| Account ID | I/O Type |
| Client ID | Workload Type |
| User ID | Dedupe-ability |
| iSCSI Session ID | Compressability |
| Time | Data Content |
| Date | Data Type |
| Read IOPS | Data Properties |
| Write IOPS | Etc. |

Example Operators (e.g., 826, 846)

| | |
|---|---|
| Equal To | Not Equal To |
| Less Than | Contains |
| Greater Than | Does Not Contain |
| Less Than or Equal To | Matches |
| Greater Than or Equal To | Regular Expression(s) |
| Within Range of | |

Example Threshold Values (e.g., 828, 848)

| | |
|---|---|
| Alpha-numeric value(s) | value (e.g., 5000 IOPS/sec) |
| Numeric value(s) | Sequential Type |
| Numeric Range(s) | Random Type |
| Numeric value per Time Interval | Text Type |
| Video Type | Image Type |
| Audio Type | Performance Class of Use Value |

Example Boolean Operators (e.g., 825, 845)

| | |
|---|---|
| AND | NAND |
| OR | NOR |
| XOR | XNOR |
| NOT | |
| EXCEPT | |

The following example scenarios help to illustrate the various features and functionalities enabled by the QoS Interface GUI 800, and help to illustrate the performance/QoS related provisioning features of the storage system:

Example A—Configuring/provisioning the storage system to automatically and/or dynamically increase storage performance to enable a backup to go faster during a specified window of time. For example, in one embodiment, the speed of a volume backup operation may be automatically and dynamically increased during a specified time interval by causing a MAX IOPS value and/or MIN IOPS value to be automatically and dynamically increased during that particular time interval.

Example B—Configuring/provisioning the storage system to automatically and/or dynamically enable a selected initiator to perform faster sequential IOs from 10 pm to Midnight.

Example C—Configuring/provisioning the storage system to automatically and/or dynamically enable a selected application to have increased I/O storage performance.

Example D—Configuring/provisioning the storage system to automatically and/or dynamically enable a selected group of clients to have their respective MAX, MIN and BURST IOPS double on selected days/dates of each month.

Example E—Configuring/provisioning the storage system to present a client or user with a "Turbo Boost" interface which includes a virtual Turbo Button. Client may elect to manually activate the Turbo Button (e.g., on the fly or in real-time) to thereby cause the storage system to automatically and dynamically increase the level of performance provisioned for that Client. For example, in one embodiment, client activation of the Turbo Button may cause the storage system to automatically and dynamically increase the client's provisioned performance by a factor of 3× for one hour. In at least one embodiment, the dynamic increase in provisioned performance may automatically cease after a predetermined time interval. In at least one embodiment, the storage system may be configured or designed to charge the client an increased billing amount for use of the Turbo Boost service/feature.

Example F—Configuring/provisioning the storage system to automatically and/or dynamically charge an additional fee or billing amount for dynamically providing increased storage array performance (e.g., to allow a faster backup) to go faster at a particular time.

Example G—Configuring/provisioning the storage system to automatically and/or dynamically charge an additional fee or billing amount for IOPS and/or I/O access of the storage system which exceeds minimum threshold value(s) during one or more designated time intervals.

Figure 4:
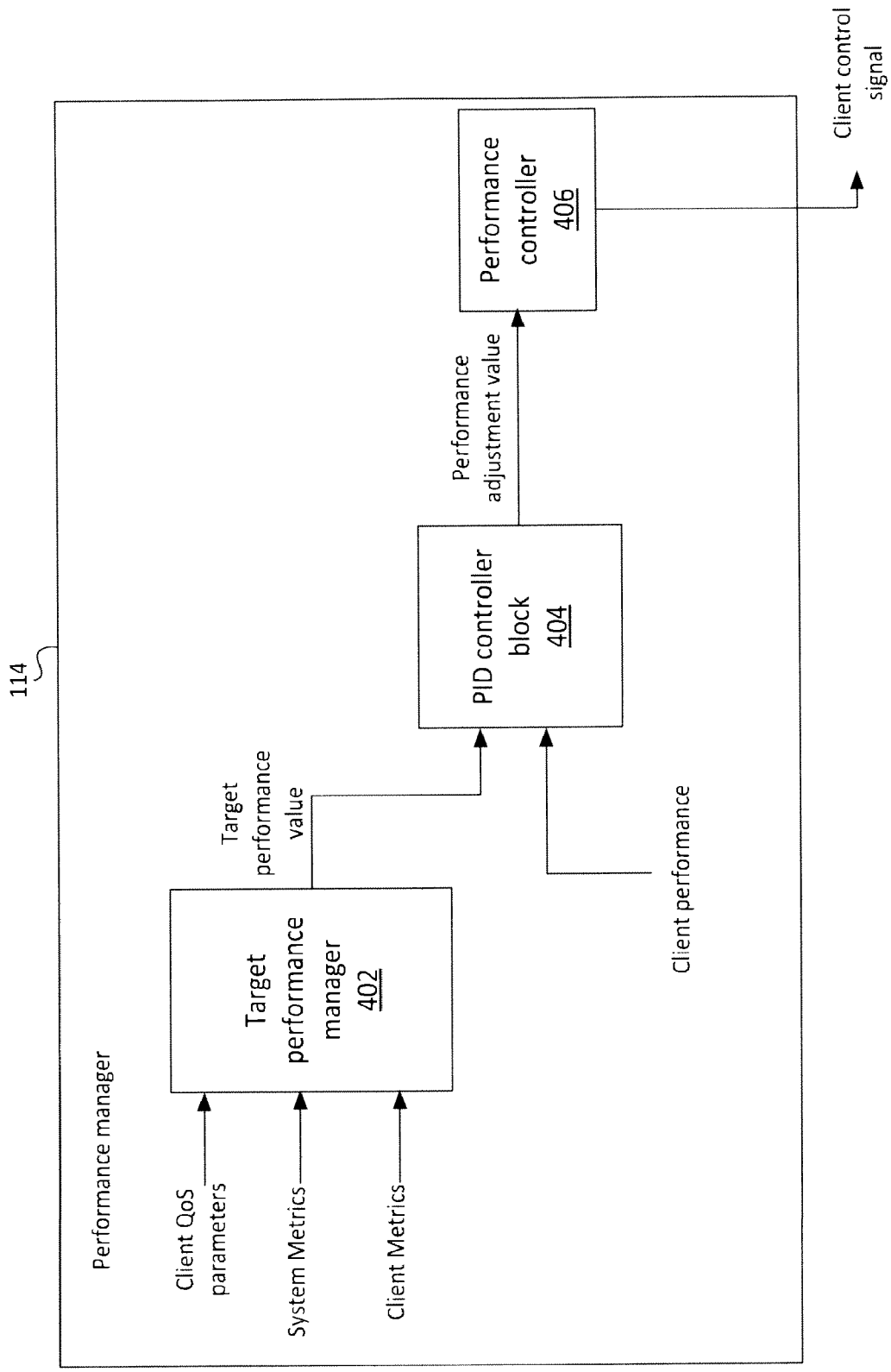
FIG. 4 depicts a more detailed example of adjusting performance using a performance manager in accordance with an illustrative implementation.

Performance manager 114 may use different ways of adjusting performance. FIG. 4 depicts a more detailed example of adjusting performance using performance manager 114 according to one implementation. A target performance manager 402 determines a target performance value. In one implementation, target performance manager 402 uses the client's QoS parameters, system metrics, and client metrics to determine the target performance value. System metrics and client metrics can be used to determine the system load and client load. As an example, client load can be measured based on a client metrics, such as in IOPS, bytes, or latency in milliseconds.

In one implementation, system metrics are data that quantifies the current load of the cluster. Various system load values can be calculated based upon the system metrics. The load values can be normalized measures of system load. For example, different load values can be compared to one another, even if the load values use different metrics in their calculations. As an example, system load can be expressed in a percentage based on the current load of the cluster. In one example, a cluster that is overloaded with processing requests may have a lower value than when the system is not overloaded. In another implementation, the target performance manger 402 receives calculated load values as input, rather than system and/or client metrics.

The target performance manager 402 can read the client QoS parameters, relevant system metrics, and relevant client metrics. These values can be used to determine the target performance value for client 108. The QoS parameters may also be dynamically adjusted during runtime by the administrator or the client as described above, such as when a higher level of performance is desired (e.g., the customer paid for a higher level of performance). The calculation of the target performance value is explained in greater detail below.

In one implementation, the target performance manager 402 outputs the target performance value to a proportion-integral-derivative (PID) controller block 404. PID controller block 404 may include a number of PID controllers for different performance metrics. Although PID controllers are described, other controllers may be used to control the performance of clients 108. In one example, PID controller block 404 includes PID controllers for IOPS, bandwidth, and latency. Target performance manager 402 outputs different target performance values for the performance metrics into the applicable PID controllers. The PID controllers also receive information about previous and/or current client performance and the target performance value. For example, the PID controllers can receive client metrics, system metrics, and/or load values, that correspond with the target performance value. The PID controller can then determine a client performance adjustment value. For example, a PID controller is configured to take feedback of previous client performance and determine a value to cause a system to move toward the target performance value. For example, a PID can cause varied amounts of pressure to be applied, where pressure in this case causes client 108 to slow down, speed up or stay the same in performing IOPS. As an example, if the target performance value is 110 IOPS and client 108 has been operating at 90 IOPS, then the client performance adjustment value is output, which by being applied to the client 108 should increase the number of IOPS being performed.

In one implementation, PID controller block 404 outputs a performance adjustment value. As an example, the performance adjustment value can be a pressure value that indicates an amount of time that the client is locked out performing IO operations within the storage system. This lock out time will cause client performance to move toward the target performance value. For example, a time in milliseconds is output that is used to determine how long to lock a client 108 out of a volume. Locking a client out of performing IO operations artificially injects latency into the client's IO operations. In another of implementations, the performance adjustment value can be a number of IO operations that the client can perform in a period of time. If the client attempts to do more IO operations, the client can be locked out of doing those IO operations until a subsequent period of time. Locking client 108 out of the volume for different times changes the number of IOPS performed by client 108. For example, locking client 108 out of the volume for shorter periods of time increases the number of IOPS that can be performed by client 108 during that period.

A performance controller 406 receives the performance adjustment value and outputs a client control signal to control the performance of client 108. For example, the amount of lockout may be calculated and applied every half second. In one implementation, clients 108 are locked out by closing and opening a command window, such as an Internet small computer system interface (iSCSI) command window. Closing the command window does not allow a client 108 to issue access requests to a volume and opening the command window allows a client 108 to issue access requests to the volume. Locking clients 108 out of a volume may adjust the number of IOPS, bandwidth, or latency for client 108. For example, if a client 108 is locked out of a volume every 50 milliseconds of every 500 milliseconds as compared to being locked out of the volume for 450 milliseconds of every 500 milliseconds, the client may issue more IOPS. For a bandwidth example, if bandwidth is constrained, then client 108 is locked out of a volume for a longer period of time to increase available bandwidth. In another implementation, the amount of data that is being serviced at a time is modified, either to zero or some number, to affect the performance at which the system services that client's IO.

Figure 5:
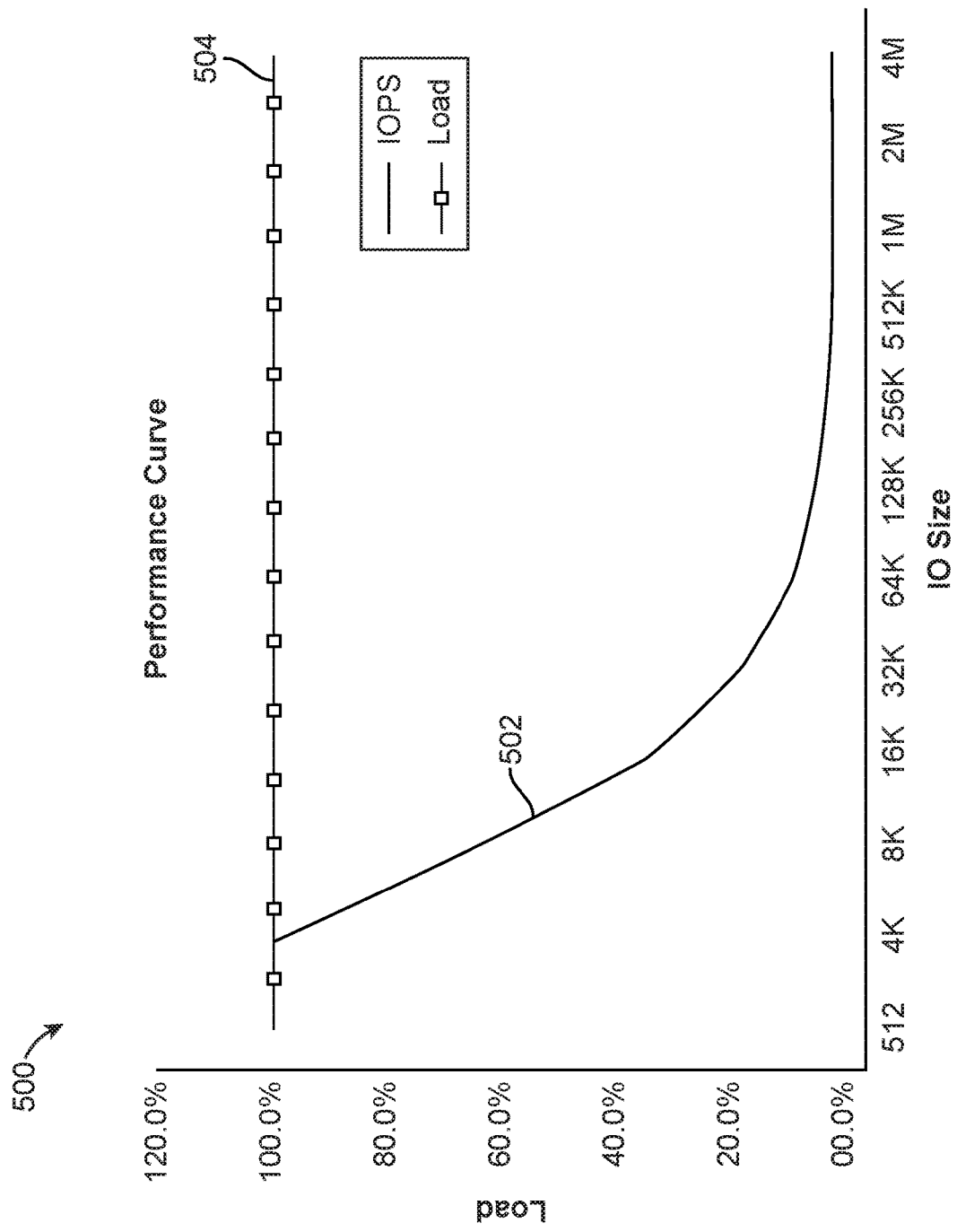
FIG. 5 depicts a performance curve comparing the size of input/output operations with system load in accordance with an illustrative implementation.

As described above, IOPS are metrics that can be used to manage performance of a client. IOPS include both write IOPS and read IOPS. Individual input/output operations do not have a set size. That is, an input operation can be writing 64 k of data to a drive, while another input operation can be writing 4 k of data to the drive. Accordingly, capturing the raw number of input/output operations over a period of time does not necessarily capture how expensive the IO operation actually is. To account for this situation, an input/output operation can be normalized based upon the size of the I/O operation. This feature allows for consistent treatment of IOPS, regardless of each operation's size of the data. This normalization can be achieved using a performance curve. FIG. 5 depicts a performance curve 500 comparing the size of input/output operations with system load in accordance with an illustrative implementation. Line 504 indicates the system at full load, while line 502 indicates the load of the system for IO operations of differing sizes. The performance curve can be determined based upon empirical data of the system 100. The performance curve allows IOPS of different sizes to be compared and to normalize IOPS of different sizes. For example, an IOP of size 32 k is roughly five times more costly than a 4 k IOP. That is, the number of IOPS of size 32 k to achieve 100% load of a system is roughly 20% of the number of IOPS of size 4 k. This is because larger block sizes have a discount of doing IP and not having to process smaller blocks of data. In various implementations, this curve can be used as a factor in deciding a client's target performance value. For example, if the target performance value for a client is determined to be 1,000 IOPS, this number can be changed based upon the average size of IOs the client has done in the past. As an example, if a client's average IO size is 4 k, the client's target performance value can remain at 1,000 IOPS. However, if the client's average IO size is determined to be 32 k, the client's target performance value can be reduced to 200 IOPS, e.g., 1,000*0.2. The 200 IOPS of size 32 k is roughly equivalent to 1,000 IOPS of size 4 k.

In determining a target performance value, the target performance manager 402 uses a client's QoS parameters to determine the target performance value for a client. In one implementation, an overload condition is detected and all clients are throttled in a consistent manner. For example, if the system load is determined to be at 20%, all clients may be throttled such that their target performance value is set to 90% of their maximum IOPS setting. If the system load increases to 50%, all clients can be throttled based upon setting their target performance value to 40% of their maximum IOPS setting.

Clients do not have to be throttled in a similar manner. For example, clients can belong to different classes of uses. In one implementation, classes of uses can be implemented simply by setting the QoS parameters of different clients differently. For example, a premium class of use could have higher QoS parameters, e.g., min IOPS, max IOPS, and burst IOPS, values compared to a normal class of use. In another implementation, the class of use can be taken into account when calculating the target performance value. For example, taking two different classes, one class could be throttled less than the other class. Using the example scenario above, clients belonging to the first class could be throttled 80% of their maximum IOPS value when the system load reaches 20%. The second class of clients, however, may not be throttled at all or by a different amount, such as 95% of their maximum IOPS value.

In another implementation, the difference between a client's minimum IOPS and maximum IOPS can be used to determine how much to throttle a particular client. For example, a client with a large difference can be throttled more than a client whose difference is small. In one implementation, the difference between the client's maximum IOPS and minimum IOPS is used to calculate a factor that is applied to calculate the target performance value. In this implementation, the factor can be determined as the IOPS difference divided by some predetermined IOPS amount, such as 5,000 IOPS. In this example, a client whose difference between their maximum IOPS and their minimum IOPS was 10,000, would be throttled twice as much as a client whose IOPS difference was 5,000. Clients of the system can be billed different amounts based upon their class. Accordingly, clients could pay more to be throttled later and/or less than other classes of clients.

In another implementation, throttling of clients can be based upon the client's use of the system. In this implementation, the target performance manager 402 can review system metrics to determine what metrics are currently overloaded. Next, the client metrics can be analyzed to determine if that client is contributing to an overloaded system value. For example, the target performance manager 402 can determine that the system is overloaded when the cluster's write latency is overloaded. The read/write IOPS ratio for a client can be used to determine if a particular client is having a greater impact on the overload condition. Continuing this example, a client whose read/write IOPS ratio was such that the client was doing three times more writes than reads and was doing 1,500 writes would be determined to be negatively impacting the performance of the cluster. Accordingly, the target performance manager 402 could significantly throttle this client. In one implementation, this feature can be done by calculating a factor based upon the read/write IOPS ratio. This factor could be applied when calculating the target performance value, such that the example client above would be throttled more than a client whose read/write IOPS ratio was high. In this example, a high read/write IOPS ratio indicates that the client is doing more reads than writes. The factor can also be based upon the number of IOPS that each client is doing. In addition, the number of IOPS for a particular client can be compared to the number of IOPS for the cluster, such that an indication of how heavily a particular client is using the cluster can be determined. Using this information, the target performance manager can calculate another factor than can be used to scale the target performance value based upon how much a client is using the system compared to all other clients.

Figure 6:
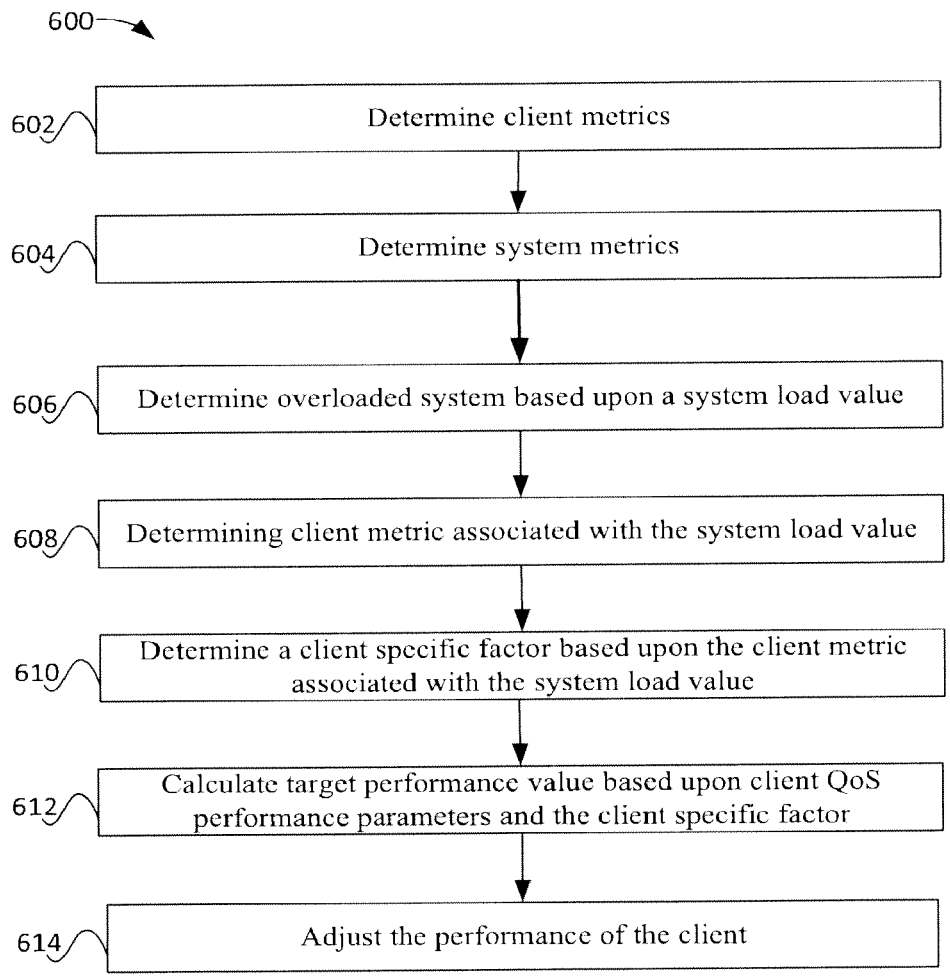
FIG. 6 depicts a simplified flowchart of a method of performing performance management that matches an overloaded system metric with a client metric in accordance with an illustrative implementation.

FIG. 6 depicts a simplified flowchart of a method 600 of performing performance management that matches an overloaded system metric with a client metric in accordance with one illustrative implementation. Additional, fewer, or different operations of the method 600 may be performed, depending on the particular embodiment. The method 600 can be implemented on a computing device. In one implementation, the method 600 is encoded on a computer-readable medium that contains instructions that, when executed by a computing device, cause the computing device to perform operations of the method 600.

In an operation 602, client metrics can be determined. For example, a performance manager 114 can determine client metrics, as described above, for a preceding period of time, e.g., 100 ms, 1 s, 10 s, etc. In an operation 604, system metrics can be determined. For example, the performance manager 114 or another process can determine system metrics as described above. In one implementation, the client metrics and/or system metrics are used to calculate one or more load values. In an operation 606, the target performance manager 402 can then determine if the system is overloaded in way based upon various load values. For example, the target performance manager 402 can determine if a system is overloaded by comparing system load values with corresponding thresholds. Any load value above its corresponding threshold indicates an overload condition. In one implementation, the system load values are analyzed in a prioritized order and the first overloaded load value is used to determine how to throttle clients.

In an operation 608, one or more corresponding client metrics associated with the overloaded load value are determined. For example, if the overloaded system load is the number of read operations, the client's number of read operations can be used as the associated client metric. The client's metric does not have to be the same as the overloaded system metric. As another example, if the overloaded system load is read latency, the corresponding client metrics can be the ratio of read to write IO operations and the total number of read operations for a client. In an operation 610, a client-specific factor is determined based upon the client metric associated with the overloaded system load value. In the first example above, the factor can be the number of the client's read operations divided by the total number of read operations of the cluster. The client factor, therefore, would be relative to how much the client is contributing to the system load value. Clients that were dong a relatively larger number of reads would have a greater client metric compared with a client that was doing a relatively smaller number of reads.

In an operation 612, the client-specific factor is used to calculate the target performance value for the client. In one implementation, an initial target performance value can be calculated and then multiplied by the client specific factor. In another implementation, a cluster reduction value is determined and this value is multiplied by the client specific factor. Continuing the example above, the cluster reduction value can be the number of read IOPS that should be throttled. Compared to throttling each client equally based upon the cluster reduction value, using the client-specific factor results in the same number of read IOPS that are throttled, but clients who have a large number of read IO operations are throttled more than clients who have a smaller number of read IO operations. Using client-specific factors helps the target performance manager 402 control the throttling of clients to help ensure that the throttling is effective. For example, if client-specific factors were not used and throttling was applied equally across all clients, a client whose use of the system was not contributing to the system's overloading would be unnecessarily throttled. Worse, the throttling of all of the clients might not be as effective since the throttling of clients who did not need to be throttled would not help ease the overloading condition, which could result in even more throttling being applied to clients.

In an operation 614, the performance manager 114 can adjust the performance of client 108. For example, the client's use of the system can be throttled as described above.

Using the above system, clients 108 may be offered performance guarantees based on performance metrics, such as IOPS. For example, given that system 100 can process a total number of IOPS, the total number may be divided among different clients 108 in terms of a number of IOPS within the total amount. The IOPS are allocated using the min, max, and burst. If it is more than the total then possible, the administrator is notified that too many IOPS are being guaranteed and instructed to either add more performance capacity or change the IOP guarantees. This notification may be before a capacity threshold is reached (e.g., full capacity or a pre-defined threshold below full capacity). The notification can be sent before the capacity is reached because client performance is characterized in terms of IOPS and the administrator can be alerted that performance is overprovisioned by N number of IOPS. For example, clients 108 may be guaranteed to be operating between a minimum and maximum number of IOPS over time (with bursts above the maximum at certain times). Performance manager 114 can guarantee performance within these QoS parameters using the above system. Because load is evenly distributed, hot spots will not occur and system 100 may operate around the total amount of IOPS regularly. Thus, without hot spot problems and with system 100 being able to provide the total amount of IOPS regularly, performance may be guaranteed for clients 108 as the number of IOPS performed by clients 108 are adjusted within the total to make sure each client is operating within the QoS parameters for each given client 108. Since each client's effect on a global pool of performance is measured and predictable, the administrator can consider the entire cluster's performance as a pool of performance as opposed to individual nodes, each with its own performance limits. This feature allows the cluster to accurately characterize its performance and guarantee its ability to deliver performance among all of its volumes.

Accordingly, performance management is provided based on the distributed data architecture. Because data is evenly distributed across all drives in the cluster, the load of each individual volume is also equal across every single drive in storage system 100. This feature may remove hot spots and allow performance management to be accurate and fairly provisioned and to guarantee an entire cluster performance for individual volumes.

Independent Control of Write IOPS and Read IOPS

In some systems, read and write IOPS are combined and can be controlled at a system level. For example, a storage system can throttle the number of IOPS that are run within a given time period. These systems, therefore, assume that a read and a write IOP are similar in regards to the cost to perform each IOP. Generally, a write IOP is more expensive to complete compared to a read IOP. For example, a write IOP can include both reading and writing metadata compared to a read IOP that can avoid any metadata writes. Treating write IOPS separately from read IOPS at a system level allows for a system to fine tune system performance. In one example, an overloaded system can throttle writes to help reduce the overloading but allow reads to continue without throttling. This can allow for users of the storage system who are doing mostly reads to see less slowdown compared to a system that would throttle read and write IOPS together.

Figure 7A:
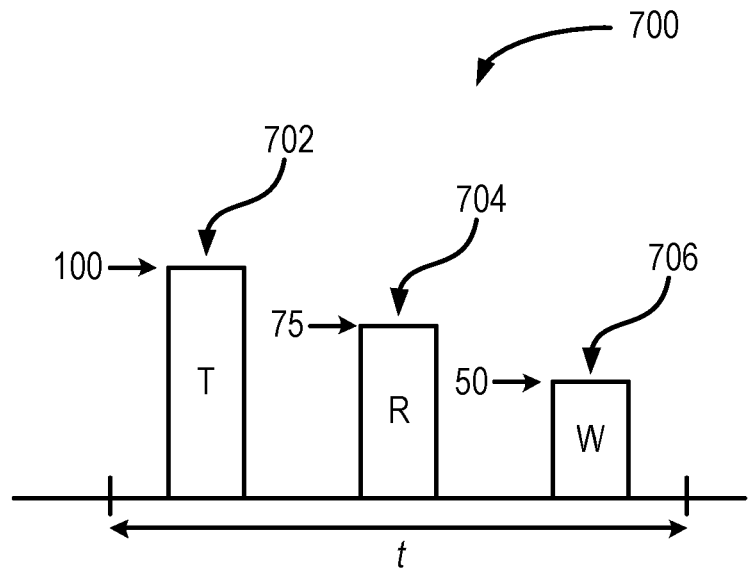
FIG. 7A illustrates an example allocation of input-output operations to a client over a period of time t in accordance with an illustrative implementation.

FIG. 7A illustrates an example allocation of IOPS 700 to a client over a period of time t. In particular, the FIG. 7A shows an allocation of total IOPS 702, read IOPS 704, and write IOPS 706 to a client over the time period t. The client, such as a client 108 shown in FIGS. 1A and 1B, is allocated 100 total IOPS 702. Of the allocated 100 IOPS, the client is allocated a maximum of 75 read IOPS 704 and a maximum of 50 write IOPS 706. That is, even though the client is allocated 100 total IOPS, the IOPS cannot exceed 50 write IOPS and cannot exceed 75 read IOPS. The client can request a combination of a number of write IOPS and a number of read IOPS that satisfy the allocation shown in FIG. 7A. It is understood that the number of total IOPS 702, the read IOPS 704, and the write IOPS 706 can have values different than the ones shown in FIG. 7A, however, the number of read IOPS 704 and the number of write IOPS 706 may not exceed the total number of IOPS 702. For example, in one or more embodiments, the number of read IOPS 704 can be equal to the total number of IOPS 702. As noted above, write IOPS are typically more expensive, in terms of system resources, than read IOPS. Reading and writing of metadata, write access times, etc. are some reasons why writes are more expensive compared to reads. Thus, the system may allow the user to request as many read IOPS as the total IOPS allocated, but limit the number of write IOPS to a number that is substantially smaller than the total IOPS.

The allocation of IOPS 700 is defined over a time period t. The time period t can represent the duration of time over which the QoS parameter for the client is defined. For example, without limitation, the time period t can be equal to about 10 ms to about 1 s.

In one or more embodiments, the allocation of total IOPS 702 shown in FIG. 7A can represent client maximum QoS parameters, such as the maximum IOPS discussed above in relation to FIG. 2. An administrator, for example, can use the user interface 200 shown in FIG. 2 to adjust the total IOPS by adjusting the maximum QoS value using sliders 202. In one or more embodiments, the user interface 200 can also display maximum read IOPS and maximum write IOPS values to the user, and provide the ability to change these values. For example, the user interface can include two additional columns one each for maximum read IOPS and maximum write IOPS. The columns can include rows of IOPS corresponding to each of the various IO sizes, such as 4 KB, 8 KB, 16 KB, and 256 KB. The user interface 200 can additionally include sliders 202 or text boxes to allow setting and changing the values of the total IOPS, read IOPS and write IOPS, in a manner similar to that discussed above in relation to altering the values of minimum IOPS, maximum IOPS, and burst IOPS in FIG. 2.

In one or more embodiments, the allocation of IOPS 700 can be determined by a performance manager, such as the performance manager 114 discussed above in relation to FIGS. 1B-6. In particular, the performance manager 114 can determine the allocation of IOPS 700 based on the result of determining target performance values for the client 108. As discussed above, the performance manager 114 can determine target performance values associated with a client 108 based at least on a load value and client quality of service parameters. The load value can quantify the health of a cluster of storage drives 116 accessed by the clients 108. For example, the load value can refer to the total number of IOPS a cluster of storage drives 116 is receiving and/or processing from one or more clients 108. The client quality of service parameters can refer to the bandwidth allocated to the client 108. In one or more embodiments, the client quality of service parameters can refer to the number of IOPS per unit time promised to a client 108. In one or more embodiments, the performance manager 114 can compare the load value to the client's quality of service parameters, and adjust the target performance values, such as the total IOPS, read IOPS and the write IOPS, such that the load value associated with the cluster of storage drives 116 is maintained at acceptable levels.

In one or more embodiments, the allocation of IOPS 700 shown in FIG. 7A can change over time based on the system and client metrics received by the performance manager 114.

For example, if the performance manager 114 determines that it has oversubscribed the available IOPS on the system, the performance manager 114 may dynamically alter the allocation of IOPS such that the available IOPS are appropriately distributed among clients 108. In one or more embodiments, each client 108 can have a different allocation of IOPS based on the quality of service agreement with that client.

Figure 7C:
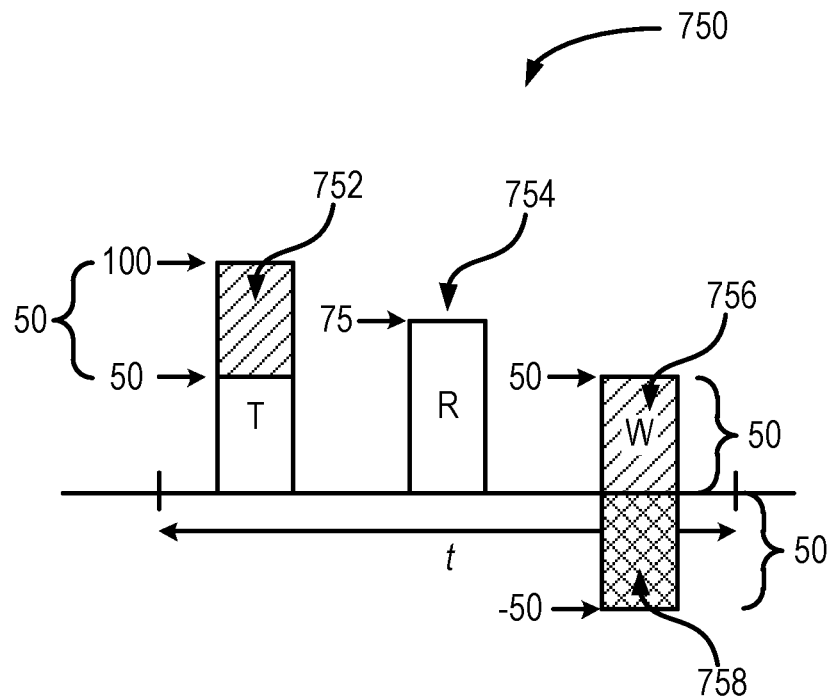
FIG. 7C shows example target IOPS associated with a client over a time period t in accordance with an illustrative implementation.
Figure 7B:
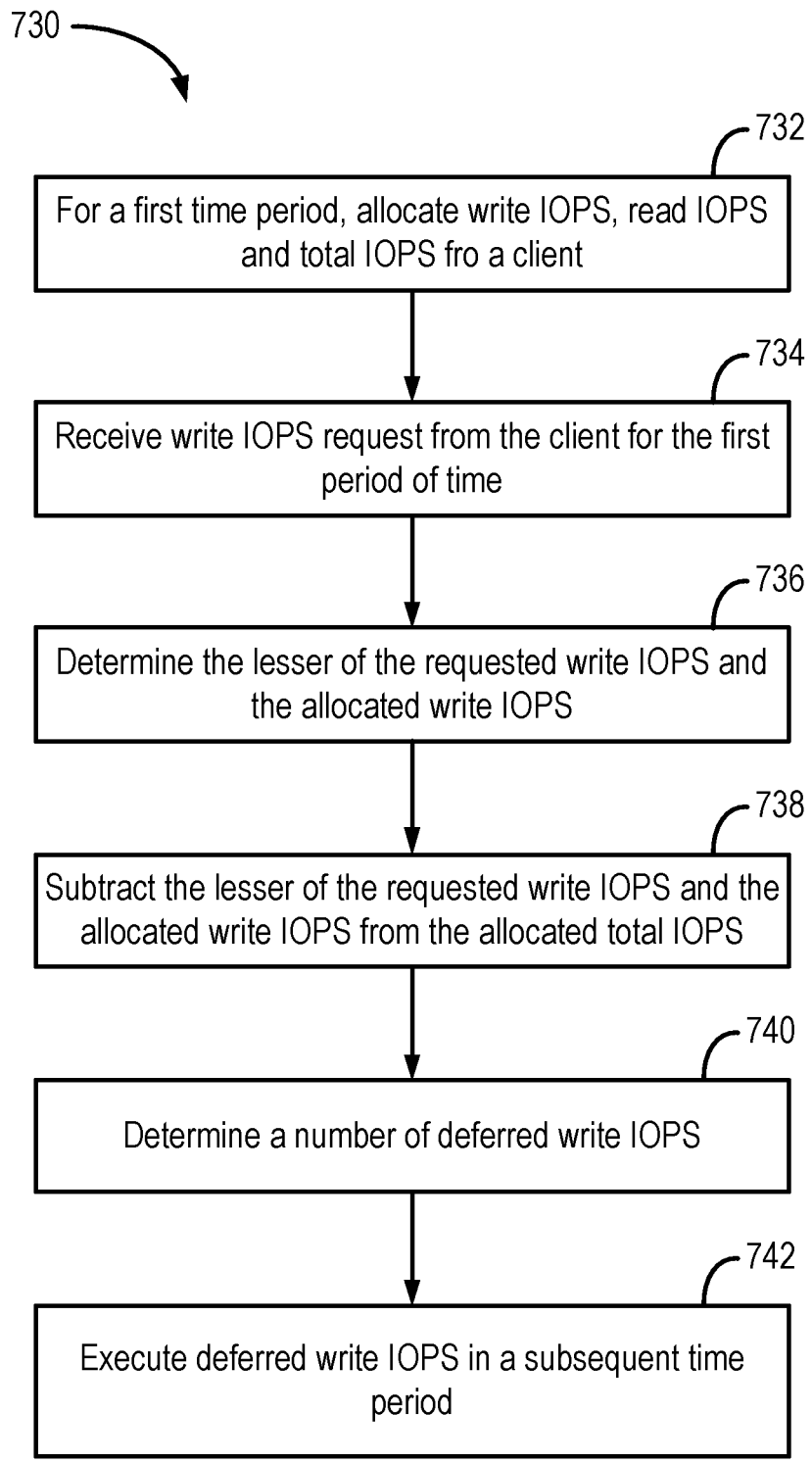
FIG. 7B shows an example flow diagram of a process for independent control of read IOPS and write IOPS associated with a client in accordance with an illustrative implementation.

FIG. 7B shows an example flow diagram of a process 730 for independent control of read IOPS and write IOPS associated with a client. In particular, the process 730 can be executed by the performance manager 114 discussed above in relation to FIGS. 1A-6. In one or more embodiments, the target performance manager 402 shown in FIG. 4 can be used to execute the process 730 to generate a set of client target performance values. In some such embodiments, the target performance values generated by the target performance manager 402 can be directly fed to the performance controller 406 without being modified by the PID controller block 404. FIG. 7C shows example target IOPS 750 associated with a client over a time period t. In particular, the target IOPS 750 illustrate a result of the execution of the process 730 shown in FIG. 7B, which result includes target total IOPS 902, target read IOPS 904, and target write IOPS 906. The process 730 shown in FIG. 7B is discussed in detail below in conjunction with the allocated IOPS 700 shown in FIG. 7A and the target IOPS 750 shown in FIG. 7C.

In some embodiments, after the client target performance values are calculated for a client, the process 730 includes, for a first time period, allocating write IOPS, read IOPS, and total IOPS for a client (operation 732). As discussed above in relation to FIG. 7A, the client can be allocated a given number of total IOPS, read IOPS and write IOPS. Specifically, FIG. 7A shows an example in which the client is allocated 100 total IOPS, 75 read IOPS, and 50 write IOPS.

; The process 730 also includes receiving write IOPS request from the client for the first time period (operation 734). As discussed above in relation to FIGS. 1A and 1B, a client 108 can request writing to client data stored in the storage 116. Typically, the client 108 will issue a write request to the metadata server 110, where the request can include the data to be written along with addressing information including, for example, the file name, the object name, or the block number, associated with client data stored in the storage 116. The metadata server 110 can translate the client addressing information into block layer addressing that can be understood by the block server 112 associated with the storage 116. The metadata server 110 also can determine the number of IOPS needed to write the client data into the storage. The number of IOPS can be determined based on, for example, the size of the IOPS handled by the block server 112. In one or more embodiments, the number of IOPS for a given client data to be written in the storage 116 is an inverse function of the size of the IOPS handled by the block server 112. The example in FIG. 9 assumes that the number of requested write IOPS corresponding to the requested client data write is equal to 100 write IOPS. It is understood that number of write IOPS can be different in other cases.

The process 730 further includes determining the lesser of the requested write IOPS and the allocated write IOPS (operation 736). This operation compares the number of requested IOPS to the number of allocated write IOPS. For example, as shown in FIG. 7C, the number of requested write IOPS (100) is greater than the number of allocated write IOPS (50). Thus, the allocated write IOPS is the lesser of the number of requested write IOPS and the number of allocated write IOPS. Further, the target write IOPS 756 is equated to the lesser of the requested write IOPS and the allocated write IOPS, that is, the allocated write IOPS (50). Of course, if the requested write IOPS were less than the allocated write IOPS (for example, if the requested number of write IOPS were 40 and the allocated write IOPS were 50), then the number of requested write IOPS would be the lesser of the number of requested write IOPS and the number of allocated write IOPS. Therefore, the number of target write IOPS 756 would be set to the number of requested write IOPS (40). It is noted that while the number of requested write IOPS of 100 is equal to the total number of allocated IOPS of 100, the allocation of only 50 write IOPS precludes the client from receiving more than 50 write IOPS for that particular time period t.

The process 730 also includes subtracting the lesser of the requested write IOPS and the allocated write IOPS from the allocated total IOPS (operation 738). In other words, the number of target write IOPS are subtracted from the number of allocated total IOPS. As shown in FIG. 7C, the 50 target write IOPS 756 are subtracted from the 100 allocated total IOPS to result in the target total IOPS 752 of 50. The target total IOPS 752 is indicated by the shaded region between 100 and 50.

The process further includes determining a number of deferred write IOPS (operation 740). The number of deferred write IOPS is determined by determining the difference between the number of requested write IOPS and the number of target write IOPS. For example, referring to FIG. 7C, the number of target write IOPS is indicated by the first shaded region 756. Subtracting the number of requested write IOPS (100) from the target write IOPS (50) 756 results in a negative number: −50. The absolute (50) of the resulting number (−50) indicates the number of deferred write IOPS 758. These deferred write IOPS indicate the number of write IOPS that are to be handled in a subsequent time period (operation 742). For example, the deferred write IOPS can be executed in a subsequent time period in a manner similar to that discussed above in relation to the requested write IOPS. Thus, if the number of allocated write IOPS in a subsequent time period is same (50) as that shown in FIG. 7A, then the deferred write IOPS can be executed in that subsequent time period. The management processor 114 may also take into account newly requested write IOPS during that subsequent time period to determine the target total and write IOPS.

It is noted that if the number of requested write IOPS is less than the number of allocated write IOPS, then there will be no deferred write IOPS. For example, if the number of number of requested write IOPS were 40, instead of 100, then the number of target write IOPS would be equal to 40, which can be accommodated by the number (50) of allocated write IOPS.

The resulting number of target total IOPS (50) leaves an additional number (50) of allocated IOPS that can be utilized by any read IOPS requested by the client. Thus, if the client 108 requests 50 read IOPS during the time period t, because the requested 50 read IOPS can be accommodated by both the allocated read IOPS (75) and the remaining allocated total IOPS (50), the requested read IOPS can be executed. It is noted that in some embodiments, the performance manager 114 may be configured to execute the requested write IOPS even if the number of requested write IOPS is greater than the number of allocated write IOPS as long as the number is less than or equal to the number of allocated total IOPS. For example, referring again to the above discussed example of receiving 100 requested write IOPS, as this number is equal to the 100 allocated total IOPS, the management processor 114 may set the target write IOPS to the requested write IOPS. In such instances, the number of allocated total IOPS would be completely exhausted for the time period t. As a result, any read IOPS requested by the client during the time period t would be denied by the management processor 114. The process 730 discussed above allows the management processor 114 to leave room for execution of read IOPS irrespective of the number of requested write IOPS.

The independent control of reads and writes can also be used when a storage system reaches a certain amount of free space. When the storage system reaches a critical level of free space, e.g., 5%, 10%, 12% of free system space and/or drive space, the system can throttle all client writes by lowering the write IOPS for the system. Such action will slow down the number of writes to the system that will further decrease the amount of free space. This allows for data to be moved off of the cluster and/or drive. In one embodiment, when this condition occurs a new cluster for one or more volumes is selected. The data from the one or more volumes are moved from the current cluster/drive and moved to the new cluster. To help facilitate this, the read IOPS of the original system can be set high to ensure that reads of the data are allowed and the write IOPS of the new cluster can be set to high at both the system level and the client level to ensure that the writes to the new cluster are not throttled. Once the data is moved to the new system, the data be deleted from the original system to free up space. In some embodiments, deletion of data can be either a write operation or considered a metadata only operation.

In various embodiments, metadata IO can be controlled independently of data IO. In one or more embodiments, the process 730 discussed above can be carried out in conjunction with the system level performance management, as discussed above in relation to the method 600 shown in FIG. 6. In particular, the performance manager 114 can throttle the allocation of the total number of IOPS based on the current performance of the system, but allocate the read IOPS 704 and write IOPS 706 independently of the allocation of the total number of IOPS. In this manner, the performance manager 114 can throttle the allocation of the total number of IOPS 702 based on the system performance, as discussed in the method shown in FIG. 6, and in addition determine the target write IOPS 756 and deferred IOPS 758 based on the process 730 shown in FIG. 7B. In some other embodiments, the total IOPS, the read IOPS, and the write IOPS may all be throttled independently of each other based on the current performance of the system.

While the allocation of IOPS 700 shown in FIG. 7A is associated with the data associated with the client, the performance manager 114 also can maintain an allocation of IOPS for metadata access IO, including both reads and writes, or separate allocations for metadata reads and metadata writes. As discussed above in relation to FIGS. 1A and 1B, the metadata layer 104 can include metadata servers 110 or in some embodiments can include volume servers 114. The metadata servers 110 and the volume servers 114 translate the addressing scheme used by the client 108 into corresponding block server layer addressing scheme associated with the block server layer 106. The metadata severs 110 and the volume servers 114 can maintain mapping information that map the client addressing scheme to the block layer addressing scheme. The mapping information is typically stored as metadata in the metadata servers 110 or the volume servers 114. In one or more embodiments, the metadata can be stored in centralized storage, which can be accessed by one or more metadata severs 110 or volume servers 114 within the metadata layer 104. Accessing the metadata can include reading and writing. In one or more embodiments, the size of the metadata, and the number of IOPS associated with the read/write transactions between the metadata server 110 and metadata storage can be very large. In one or more such embodiments, the performance of the system can be impacted by not only the read and write IOPS associated with client data, but also due to the reads and write IOPS associated with the metadata.

In one or more embodiments, total, read, and write IOPS can be allocated to the metadata servers 110 or volume servers 114 for accessing metadata in a manner similar to that discussed above in relation to accessing client data. For example, a metadata performance manager, similar to the performance manager 114, can be used to manage system performance based on the metadata IOPS. The metadata performance manager can allocate total IOPS, read IOPS, and write IOPS for a metadata server 110 or a volume server 114. The metadata performance server can receive requested read and write IOPS from the metadata server 110 or the volume server 114 just as the performance manager 114 received read and write IOPS requests from clients. In a manner similar to the process 730 discussed above in relation to the performance manager 114, the metadata performance manager also can determine target read IOPS, target write IOPS and target total IOPS associated with metadata access. For example, the metadata performance manager can limit the number of target metadata write IOPS from exceeding the total metadata IOPS within a time period such that there are at least some room for executing any received metadata read IOPS during the same time period. The metadata performance manager can further determine deferred metadata write IOPS in cases where the requested metadata write IOPS exceeds the allocated metadata write IOPS in a manner similar to that discussed above in relation to client data write IOPS in FIGS. 7A-7C.

In one or more embodiments, the metadata performance manager can dynamically change the allocated total, read, and write IOPS based on the system performance. In one or more embodiments, the metadata performance manager can receive system metrics as well as metadata metrics (such as, for example, metadata read/write IOPS, metadata storage capacity, or bandwidth) as inputs to determine the current load of the system and based on the determined current load and the system reallocate the total, read, and write IOPS. As one example, metadata access can be increased during certain system level operations, such as moving one or more volumes to another cluster or storage device.

Load Value Calculations

Load values can be used to determine if a client should be throttled to help ensure QoS among all clients. Various load values can be calculated based upon one or more system metric and/or client metric. As an example, a load value can be calculated that corresponds to a client's data read latency. When calculating a load value that corresponds with a client, how the client's data is managed on the storage system becomes important.

Figure 9:
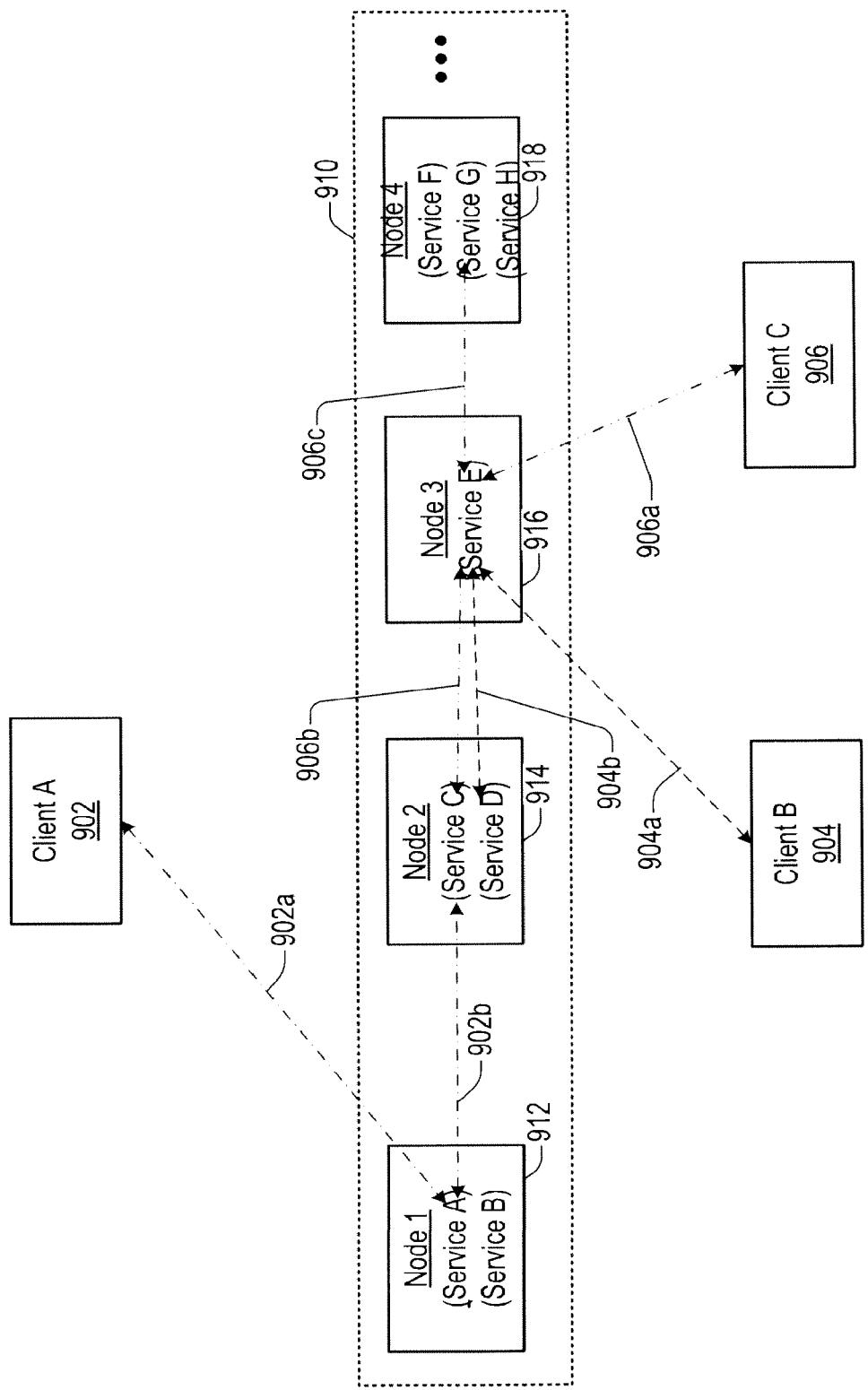
FIG. 9 shows a portion of a storage system in accordance with an illustrative implementation.

FIG. 9 shows a portion of a storage system in accordance with one illustrative implementation. In the specific example embodiment of FIG. 9, the storage system is shown to include a cluster 910 of nodes (912, 914, 916, and 918). According to different embodiments, each node may include one or more storage devices such as, for example, one or more solid state drives (SSDs). In the example embodiment of FIG. 9, it is assumed for purposes of illustration that three different clients (e.g., Client A 902, Client B 904, and Client C 906) are each actively engaged in the reading/writing of data from/to storage cluster 910.

Additionally, as illustrated in the example embodiment of FIG. 9, each node may have associated therewith one or more services (e.g., Services A-H), wherein each service may be configured or designed to handle a particular set of functions and/or tasks. For example, as illustrated in the example embodiment of FIG. 9: Services A and B may be associated with (and/or may be handled by) Node 1 (912); Services C and D may be associated with (and/or may be handled by) Node 2 (914); Service E may be associated with (and/or may be handled by) Node 3 (916); Services F, G, H may be associated with (and/or may be handled by) Node 4 (918). In at least one embodiment, one or more of the services may be configured or designed to implement a slice server. A slice server can also be described as providing slice service functionality.

Additionally, according to different embodiments, a given service may have associated therewith at least one primary role and further may have associated therewith one or more secondary roles. For example, in the example embodiment of FIG. 9, it is assumed that Service A has been configured or designed to include at least the following functionality: (1) a primary role of Service A functions as the primary slice service for Client A, and (2) a secondary role of Service A handles the data/metadata replication tasks (e.g., slice service replication tasks) relating to Client A, which, in this example involves replicating Client A's write requests (and/or other slice-related metadata for Client A) to Service C. Thus, for example, in one embodiment, write requests initiated from Client A may be received at Service A 902a, and in response, Service A may perform and/or initiate one or more of the following operations (or combinations thereof):

process the write request at Service A's slice server, which, for example, may include generating and storing related metadata at Service A's slice server;

(if needed) cause the data (of the write request) to be saved in a first location of block storage (e.g., managed by Service A);

forward (902b) the write request (and/or associated data/metadata) to Service C for replication.

In at least one embodiment, when Service C receives a copy of the Client A write request, it may respond by processing the write request at Service C's slice server, and (if needed) causing the data (of the write request) to be saved in a second location of block storage (e.g., managed by Service C) for replication or redundancy purposes. In at least one embodiment, the first and second locations of block storage may each reside at different physical nodes. Similarly Service A's slice server and Service C's slice server may each be implemented at different physical nodes.

Accordingly, in the example embodiment of FIG. 9, the processing of a Client A write request may involve two distinct block storage write operations—one initiated by Service A (the primary Service) and another initiated by Service C (the redundant Service). On the other hand, the processing of a Client A read request may only be handled by Service A (e.g., under normal conditions) since Service A is without involving Service C) since Service A is able to handle the read request without necessarily involving Service C.

For purposes of illustration, in the example embodiment of FIG. 9, it is also assumed that Service E has been configured or designed to include at least the following functionality: (1) a primary role of Service E functions as the primary slice service for Client B, and (2) a secondary role of Service E handles the data and/or metadata replication tasks (e.g., slice service replication tasks) relating to Client B, which, in this example involves replicating Client B's write requests (and/or other Slice-related metadata for Client B) to Service D. Thus, for example, in one embodiment, write requests initiated from Client B may be received at Service E 904a, and in response, Service E may perform and/or initiate one or more of the following operations (or combinations thereof):

process the write request at Service E's slice server, which, for example, may include generating and storing related metadata at Service E's slice server;

(if needed) cause the data (of the write request) to be saved in a first location of block storage (e.g., managed by Service E);

forward (904b) the write request (and/or associated data/metadata) to Service D for replication.

In at least one embodiment, when Service D receives a copy of the Client B write request, it may respond by processing the write request at Service D's slice server, and (if needed) causing the data (of the write request) to be saved in a second location of block storage (e.g., managed by Service D) for replication or redundancy purposes. In at least one embodiment, the first and second locations of block storage may each reside at different physical nodes. Similarly Service E's slice server and Service D's slice server may each be implemented at different physical nodes.

According to different embodiments, it is also possible to implement multiple replication (e.g., where the data/metadata is replicated at two or more other locations within the storage system/cluster). For example, as illustrated in the example embodiment of FIG. 9, it is assumed that Service E has been configured or designed to include at least the following functionality: (1) a primary role of Service E functions as the primary slice service for Client C, (2) a secondary role of Service E handles the data and/or metadata replication tasks (e.g., slice service replication tasks) relating to Client C, which, in this example involves replicating Client C's write requests (and/or other Slice-related metadata for Client C) to Service C; and (3) a secondary role of Service E handles the data and/or metadata replication tasks (e.g., slice service replication tasks) relating to Client C, which, in this example involves replicating Client C's write requests (and/or other Slice-related metadata for Client C) to Service G. Thus, for example, in one embodiment, write requests initiated from Client C may be received at Service E 906a, and in response, Service E may perform and/or initiate one or more of the following operations (or combinations thereof):

process the write request at Service E's slice server, which, for example, may include generating and storing related metadata at Service E's slice server;

(if needed) cause the data (of the write request) to be saved in a first location of block storage (e.g., managed by Service E);

forward (906b) the write request (and/or associated data/metadata) to Service C for replication;

forward (906c) the write request (and/or associated data/metadata) to Service G for replication.

In at least one embodiment, when Service C receives a copy of the Client C write request, it may respond by processing the write request at Service C's slice server, and (if needed) causing the data (of the write request) to be saved in a second location of block storage (e.g., managed by Service C) for replication or redundancy purposes. Similarly, In at least one embodiment, when Service G receives a copy of the Client C write request, it may respond by processing the write request at Service G's slice server, and (if needed) causing the data (of the write request) to be saved in a third location of block storage (e.g., managed by Service G) for replication or redundancy purposes.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method for managing input-output operations (IOPS) for a storage system connected to a client, comprising:
    receiving, at the storage system, a number of allocated total IOPS, a number of allocated read IOPS and a number of allocated write IOPS for the client accessing the storage system;
    receiving, at the storage system, a requested number of write IOPS associated with one or more client requests to write to the storage system;
    determining, at the storage system, a target number of write IOPS based on the number of allocated total IOPS and the number of allocated write IOPS; and
    regulating, by the storage system, a client write IOPS using a proportional-integral-derivative controller to match the determined target number of write IOPS within a first time period based on feedback of the requested number of write IOPS without increasing a latency of the client write IOPS.

2. The method of claim 1, wherein regulating the client write IOPS is implemented by locking out access to volumes at the storage system by the client.

3. The method of claim 1, further comprising determining a deferred number of client write IOPS based on a difference between the number of allocated write IOPS and the requested number of write IOPS, and assigning the deferred number of write IOPS for execution in a second time period after the first time period.

4. The method of claim 1, further comprising determining the number of allocated total IOPS based on at least one of a read latency and a write latency associated with the storage system and at least one quality of service parameter associated with the client.

5. The method of claim 1, further comprising determining the number of allocated total IOPS based on a space utilization of the storage system and at least one of a bandwidth and a latency as a quality of service associated with the client.

6. The method of claim 1, further comprising determining the number of allocated total IOPS dynamically based on a change in at least one of a read latency and a write latency of the storage system.

7. The method of claim 1, further comprising regulating, by the storage system, a client read IOPS separately from the regulation of the client write IOPS.

8. The method of claim 7, wherein regulating the client write IOPS to match the determined target number of write IOPS further comprises throttling the client access to the storage system based on a minimum IOPS and a maximum IOPS associated with the client.

9. A system comprising:
a storage system having data accessible by a client; and
a processor coupled to the storage system, the processor configured to:
receive a number of allocated total input-output operations (IOPS), a number of allocated read IOPS and a number of allocated write IOPS for the client accessing the storage system,
receive a requested number of write IOPS associated with one or more client requests to write to the storage system,
determine a target number of write IOPS based on the number of allocated total IOPS and the number of allocated write IOPS, and
regulate client write IOPS using a proportional-integral-derivative controller to match the determined target number of write IOPS within a first time period based on feedback of the requested number of write IOPS without increasing a latency of the client write IOPS.

10. The system of claim 9, wherein the processor configured to regulate the client write IOPS is implemented by locking out access to volumes at the storage system by the client.

11. The system of claim 9, wherein the processor is further configured to determine a deferred number of write IOPS based on a difference between the number of allocated write IOPS and the requested number of write IOPS, and assign the deferred number of write IOPS for execution in a second time period after the first time period.

12. The system of claim 9, wherein the processor is further configured to determine the number of allocated total IOPS based on at least one of a read latency and a write latency associated with the storage system and at least one quality of service parameter associated with the client.

13. The system of claim 9, wherein the processor is further configured to determine the number of allocated total IOPS based on a space utilization of the storage system and at least one of a bandwidth and a latency as a quality of service associated with the client.

14. The system of claim 9, wherein the processor is further configured to dynamically determine the number of allocated total IOPS based on a change in at least one of a read latency and a write latency of the storage system.

15. The system of claim 9, wherein the processor is further configured to:
regulate a client read IOPS separately from the regulation of the client write IOPS.

16. The system of claim 15, wherein the processor configured to regulate the client write IOPS to match the determined target number of write IOPS further comprises throttling the client access to the storage system based on a minimum IOPS and a maximum IOPS associated with the client.

17. The method of claim 1 further comprising adjusting the target number of write IOPS based on a load value associated with storage drives of the storage system.

18. The system of claim 9 wherein the processor is further configured to adjust the target number of write IOPS based on a load value associated with storage drives of the storage system.

19. The system of claim 9 wherein the processor is further configured to use client load values to regulate the client write IOPS.

20. A non-transitory computer readable medium containing executable program instructions for execution by a processor, the program instructions configured to:
receive a number of allocated total input-output operations (IOPS), a number of allocated read IOPS and a number of allocated write IOPS of a storage system,
determine a target number of write IOPS of a client accessing the storage system based on the number of allocated total IOPS and the number of allocated write IOPS, and
regulate a client write IOPS using a proportional-integral-derivative controller to match the determined target number of write IOPS within a time period based on feedback of a current write IOPS of the client without increasing a latency of the client write IOPS.

* * * * *